(12) United States Patent
Campbell et al.

US011889174B2

(10) Patent No.: US 11,889,174 B2
(45) Date of Patent: Jan. 30, 2024

(54) INTEGRATED IMAGE SENSOR AND LENS ASSEMBLY

(71) Applicant: GoPro, Inc., San Mateo, CA (US)

(72) Inventors: Scott Patrick Campbell, Belmont, CA (US); Thomas Czepowicz, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/722,446

(22) Filed: Apr. 18, 2022

(65) Prior Publication Data

US 2022/0239816 A1 Jul. 28, 2022

Related U.S. Application Data

(63) Continuation of application No. 16/735,183, filed on Jan. 6, 2020, now Pat. No. 11,336,807, which is a continuation of application No. 16/144,140, filed on Sep. 27, 2018, now Pat. No. 10,530,978, which is a
(Continued)

(51) Int. Cl.
| | |
|---|---|
| *H04N 23/57* | (2023.01) |
| *G03B 17/12* | (2021.01) |
| *G03B 43/00* | (2021.01) |
| *H04N 23/51* | (2023.01) |
| *H04N 23/54* | (2023.01) |
| *H04N 23/55* | (2023.01) |

(52) U.S. Cl.
CPC ............. *H04N 23/57* (2023.01); *G03B 17/12* (2013.01); *G03B 43/00* (2013.01); *H04N 23/51* (2023.01); *H04N 23/54* (2023.01); *H04N 23/55* (2023.01)

(58) Field of Classification Search
CPC ........ H04N 23/57; H04N 23/51; H04N 23/54; H04N 23/55; G03B 17/12; G03B 43/00
See application file for complete search history.

(56) References Cited

U.S. PATENT DOCUMENTS

| | | | |
|---|---|---|---|
| 7,773,876 B2 * | 8/2010 | Westerweck | G03B 17/02 396/79 |
| 9,609,195 B2 | 3/2017 | Czepowicz | |
| 10,122,902 B2 | 11/2018 | Campbell | |
| (Continued) | | | |

FOREIGN PATENT DOCUMENTS

| | | |
|---|---|---|
| JP | 2009075270 A | 4/2009 |
| JP | 2009186756 A | 8/2009 |

OTHER PUBLICATIONS

English Translation KR 10-2011-0125599, 8 pages, (Year: 2011).
(Continued)

*Primary Examiner* — Lin Ye
*Assistant Examiner* — John H Morehead, III
(74) *Attorney, Agent, or Firm* — Young Basile Hanlon & MacFarlane, P.C.

(57) ABSTRACT

An integrated image sensor and lens assembly is disclosed that includes: an image sensor assembly defining an optical axis; a lens holder; and a lens barrel. The lens holder is coupled to the image sensor assembly and includes a tubular body portion terminating in a tapered surface that extends at an angle to the optical axis. The lens barrel is coupled to the lens holder by an adhesive that is applied between the lens holder and the lens barrel such that the adhesive extends in non-perpendicular relation to the optical axis.

20 Claims, 8 Drawing Sheets

Related U.S. Application Data continuation of application No. 14/705,891, filed on May 6, 2015, now Pat. No. 10,122,902.

(60) Provisional application No. 62/019,146, filed on Jun. 30, 2014, provisional application No. 61/990,053, filed on May 7, 2014.

(56) References Cited

U.S. PATENT DOCUMENTS

| | | | |
|---|---|---|---|
| 10,293,264 B2 | 5/2019 | Hirose | |
| 10,530,978 B2 | 1/2020 | Campbell | |
| 11,336,807 B2 | 5/2022 | Campbell | |
| 2007/0176086 A1* | 8/2007 | Hiltunen | H04N 23/57 250/239 |
| 2008/0105819 A1* | 5/2008 | Wu | H01L 27/14618 250/239 |
| 2008/0291316 A1* | 11/2008 | Cheng | H04N 23/57 348/340 |
| 2008/0297645 A1* | 12/2008 | Lo | G02B 13/001 438/69 |
| 2010/0141825 A1* | 6/2010 | Kim | H01L 27/14618 156/305 |
| 2010/0157143 A1* | 6/2010 | Kim | H04N 23/54 348/374 |
| 2011/0037893 A1* | 2/2011 | Okada | H04N 23/57 348/374 |
| 2011/0293264 A1* | 12/2011 | Sato | H04N 23/54 396/529 |
| 2012/0019940 A1* | 1/2012 | Lu | H01L 27/14618 359/819 |
| 2012/0141114 A1* | 6/2012 | Gooi | G03B 17/12 156/60 |
| 2012/0169907 A1* | 7/2012 | Lee | H04N 23/55 348/294 |
| 2012/0288272 A1* | 11/2012 | Pavithran | G03B 17/12 29/466 |
| 2013/0015531 A1 | 1/2013 | Kim | |
| 2013/0063655 A1* | 3/2013 | Hsu | H04N 23/55 156/303.1 |
| 2013/0155311 A1* | 6/2013 | Grandin | H04N 23/57 348/E5.026 |
| 2013/0240714 A1* | 9/2013 | Higashitsutsumi | H04N 23/10 250/208.1 |
| 2014/0298642 A1* | 10/2014 | Sesti | H04N 23/55 29/592.1 |
| 2014/0307099 A1* | 10/2014 | Yeon | H04N 23/55 29/832 |
| 2014/0326855 A1* | 11/2014 | Lu | H04N 23/57 359/619 |
| 2015/0326763 A1 | 11/2015 | Campbell | |
| 2015/0326766 A1 | 11/2015 | Czepowicz | |
| 2016/0012610 A1* | 1/2016 | Clemente | A61B 5/443 600/315 |
| 2019/0028625 A1 | 1/2019 | Campbell | |
| 2020/0145565 A1 | 5/2020 | Campbell | |

OTHER PUBLICATIONS

PCT International Search Report and Written Opinion, PCT Application No. PCT/US15/29547, dated Aug. 7, 2015, eleven pages.

* cited by examiner

INTEGRATED IMAGE SENSOR AND LENS ASSEMBLY

CROSS-REFERENCE TO RELATED APPLICATION(S)

This application is a continuation of U.S. patent application Ser. No. 16/735,183, filed on Jan. 6, 2020, which is a continuation of U.S. patent application Ser. No. 16/144,140, filed on Sep. 27, 2018, now U.S. Pat. No. 10,530,978, which is a continuation of U.S. patent application Ser. No. 14/705,891, filed on May 6, 2015, now U.S. Pat. No. 10,122,902, which claims the benefit of U.S. Provisional Patent Application Ser. No. 62/019,146, filed Jun. 30, 2014, and U.S. Provisional Patent Application Ser. No. 61/990,053, filed May 7, 2014. The subject matter of each of the above-identified applications is incorporated herein by reference in its entirety.

BACKGROUND

Manufacturing of lens assemblies for high-resolution cameras typically require a high degree of precision in positioning components of the lens assembly to ensure that the lens will achieve proper focus. As a result, a challenge exists in achieving a fast, automated, and high-yielding assembly process for high-resolution cameras.

In a conventional manufacturing process, a lens barrel housing the camera lens is placed within a housing assembly affixed to an image sensor. Upon testing the lens barrel to position it for proper alignment, the lens barrel is affixed to the housing assembly using a "floating" assembly process whereby the lens barrel is attached to the housing using adhesive between a ridge of the lens barrel extending parallel to the image plane and an inner lip of the housing extending parallel to the image plane. The adhesive may expand and/or contract when cured, or after curing, the adhesive may expand and/or contract over time based on changes in temperature or other conditions. Because the adhesive is placed between surfaces of the lens barrel and housing that are parallel to the image plane, the expansion or contraction of the adhesive causes the lens to shift along the optical axis, thus altering the distance between the lens and the image sensor. This affects focus of the lenses and compromises performance and yield.

DETAILED DESCRIPTION OF THE DRAWINGS

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In an embodiment, an integrated image sensor and lens assembly comprises a lens barrel adhered to a lens holder using an adhesive ring applied between an exterior surface of the lens barrel and an interior surface of the lens holder that are oriented in a direction perpendicular to the image plane (parallel to the optical axis). The lens barrel and lens holder are bonded based on the sheer strength (rather than the tensile strength) of the adhesive. Thus, adhesive expansion does not substantially affect the distance between the lens and the image sensor and therefore does not affect the focal plane of the assembly. As described herein, substantially constant refers to the optical distance is within a predefined tolerance that would be acceptable to those skilled in art. In various embodiments, the predefined tolerance can be, for example, a 1% tolerance, a 2% tolerance, a 5% tolerance, etc. While expansion or contraction of the adhesive may still occur, the forces are directed radially (rather than axially) and are counteracted because the adhesive is applied concentrically.

In another embodiment, an integrated image sensor and lens assembly comprises a lens barrel adhered to an image sensor assembly using an adhesive applied between a surface of the lens barrel and an outer side wall of the image sensor assembly that are oriented in a direction perpendicular to the image plane (parallel to the optical axis). The lens barrel and image sensor assembly are bonded based on the sheer strength (rather than the tensile strength) of the adhesive. Thus, adhesive expansion does not substantially affect the distance between the lens and the image sensor and therefore does not affect the focal plane of the assembly. While expansion or contraction of the adhesive may still occur, the forces are directed radially (rather than axially) and are counteracted because the adhesive is applied concentrically.

Figure 1:
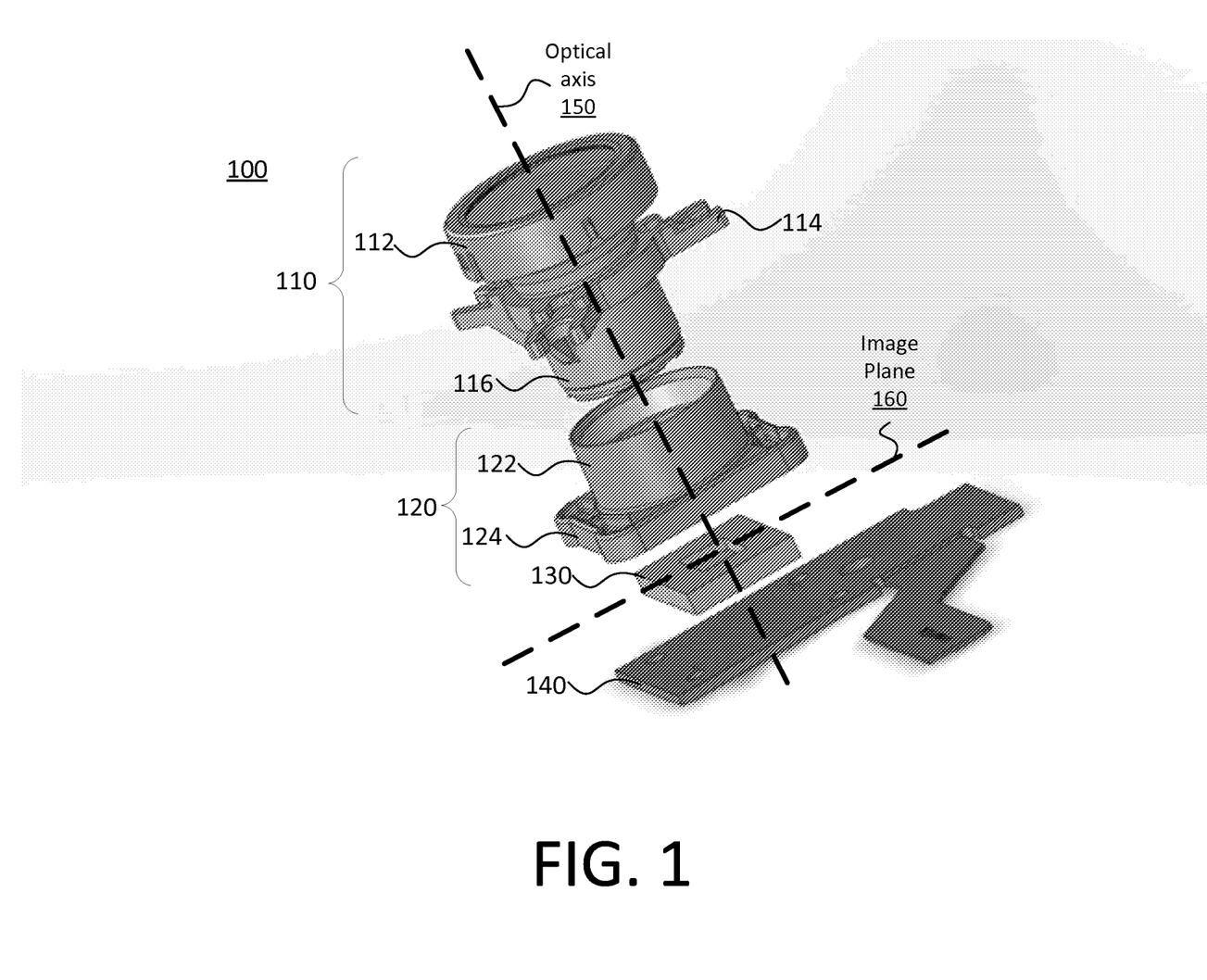
FIG. 1 illustrates an exploded view of an example integrated image sensor and lens assembly, according to one embodiment.

FIG. 1 illustrates an exploded view of an embodiment of an integrated image sensor and lens assembly 100. The integrated image sensor and lens assembly 100 comprises an image sensor substrate 140, an image sensor assembly 130, a lens holder 120, and a lens barrel 110. The image sensor substrate 140 comprises a printed circuit board for mounting the image sensor assembly 130 and may furthermore include various electronic components that that operate with the image sensor assembly 130 or provide external connections to other components of the camera system. The image sensor assembly 130 houses an image sensor (e.g., a high-definition image sensor) for capturing images and/or video and includes structural elements for physically coupling the image sensor assembly 130 to the image sensor substrate 140 and to the lens holder 120. The image sensor of the image sensor assembly 130 lies on an image plane 160. The lens holder 120 physically couples with the image sensor assembly 130 and the lens barrel 110. In one embodiment, the lens holder 120 comprises a base portion 124 and a tube portion 122. The base portion 124 includes a bottom surface in a plane substantially parallel to a surface of the image sensor substrate 140. Furthermore, the base portion 124 includes a recess (not viewable in FIG. 1) to enable the bottom surface of the base portion 124 to lie flat against the image sensor substrate 140 while partially enclosing the image sensor assembly 130. The tube portion 122 of the lens holder 120 extends away from the image sensor assembly 130 along the optical axis 150 and includes a substantially cylindrical channel for receiving the lens barrel 110. The lens barrel 110 comprises one or more lenses or other optical components to direct light to the image sensor assembly 130. The lens barrel 110 comprises a lower portion 116, one or more barrel arms 114, and a lens window 112. The lower portion of the lens barrel 116 is substantially cylindrical and structured to at least partially extend into the channel of the tube portion 122 of the lens holder 120. The lens arms 114 extend radially from the body of the lens barrel 110 and are outside the channel of the lens holder 120 when assembled. The lens arms 114 may be used to physically couple the lens barrel 110 to the camera body (not shown). The lens window 112 includes optical components to enable external light to enter the lens barrel 110 and be directed to the image sensor assembly 130.

Figure 2:
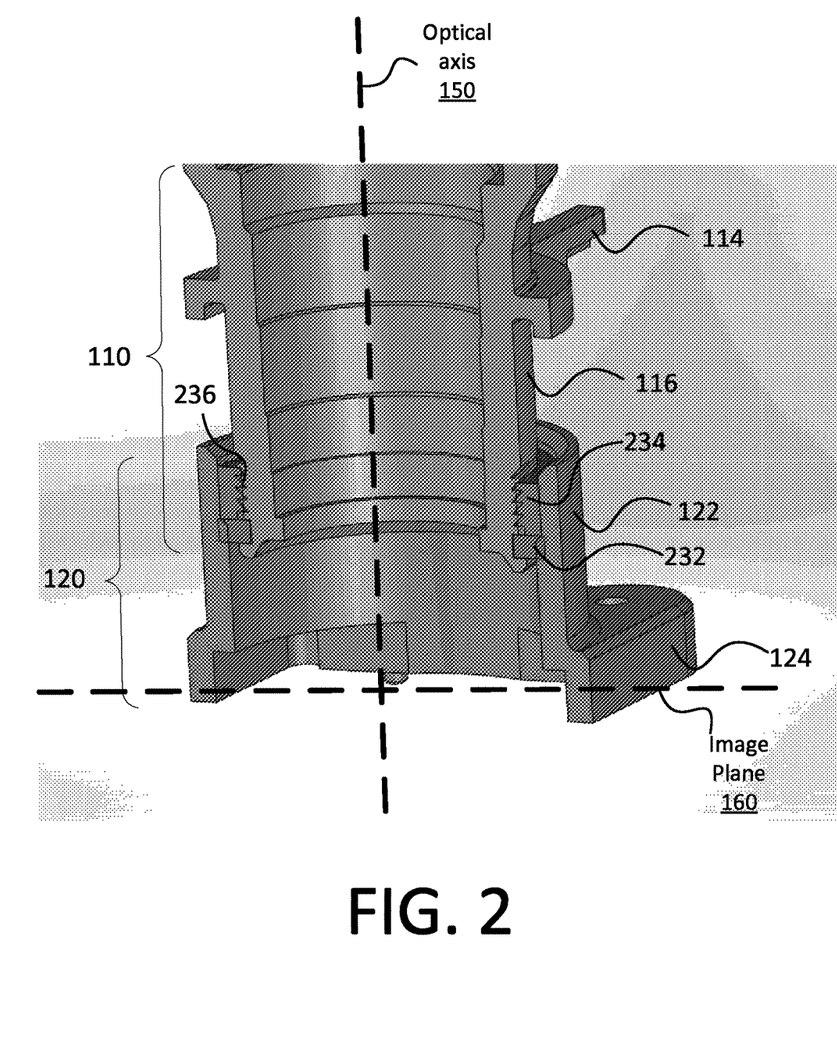
FIG. 2 illustrates a cross-sectional view of the lens holder and lens barrel sliced along a plane parallel to the optical axis, according to one embodiment.

FIG. 2 illustrates a cross-sectional view of the lens holder 120 and lens barrel 110 sliced along a plane parallel to the optical axis 150. Interior components (e.g., lenses) of the lens barrel 110 are omitted to more clearly show the structural features of the lens barrel 110. As illustrated in FIG. 2, the lower portion 116 of the lens barrel 110 partially extends into the tube portion 122 of the lens holder 120. An adhesive 234 is applied between an interior surface of the tube portion 122 that is oriented parallel to the optical axis 150 and an exterior surface of the lower portion 116 of the lens barrel 110 (also oriented parallel to the optical axis 150) to radially bond the lens barrel 110 to the lens holder 120. The section of the lower portion 16 of the lens barrel 110 that extends into the tube portion 122 of the lens holder 120 is adhered to the tube portion 122 via the adhesive 234. The lens barrel 110 and lens holder 120 are bonded based on the sheer strength of the adhesive 234. If expansion of the adhesive 234 occurs, the forces will be directed radially (i.e., along a plane parallel to the image plane) and will therefore not substantially affect the distance between the lens of the lens barrel 110 and the image plane 160.

In the illustrated embodiment, the lower portion 16 of the lens barrel 110 includes a plurality of ridges 236 on the exterior surface. The ridges 236 increase the surface area on the exterior surface of the lower portion 116 for the adhesive 234 to bond to and thereby increase the adhesive strength.

The illustrated embodiment also shows a gasket 232 positioned at a lower end of the lens barrel 110 just below the adhesive 234. The gasket 232 may be used in the manufacturing process as a barrier to prevent the adhesive 234 from overflowing and potentially reaching the image sensor if the adhesive 234 is insufficiently viscous. In one embodiment, the gasket 232 comprises a pliable material (e.g., rubber, plastic, etc.) so that it does not prevent fine adjustments from being made to the positioning of the lens barrel 110 relative to the image sensor assembly 130 along the optical axis during the assembly and alignment process. The pliability of the gasket 232 furthermore absorbs any forces along the optical axis caused by expansion or contraction of the adhesive 234.

Figure 3:
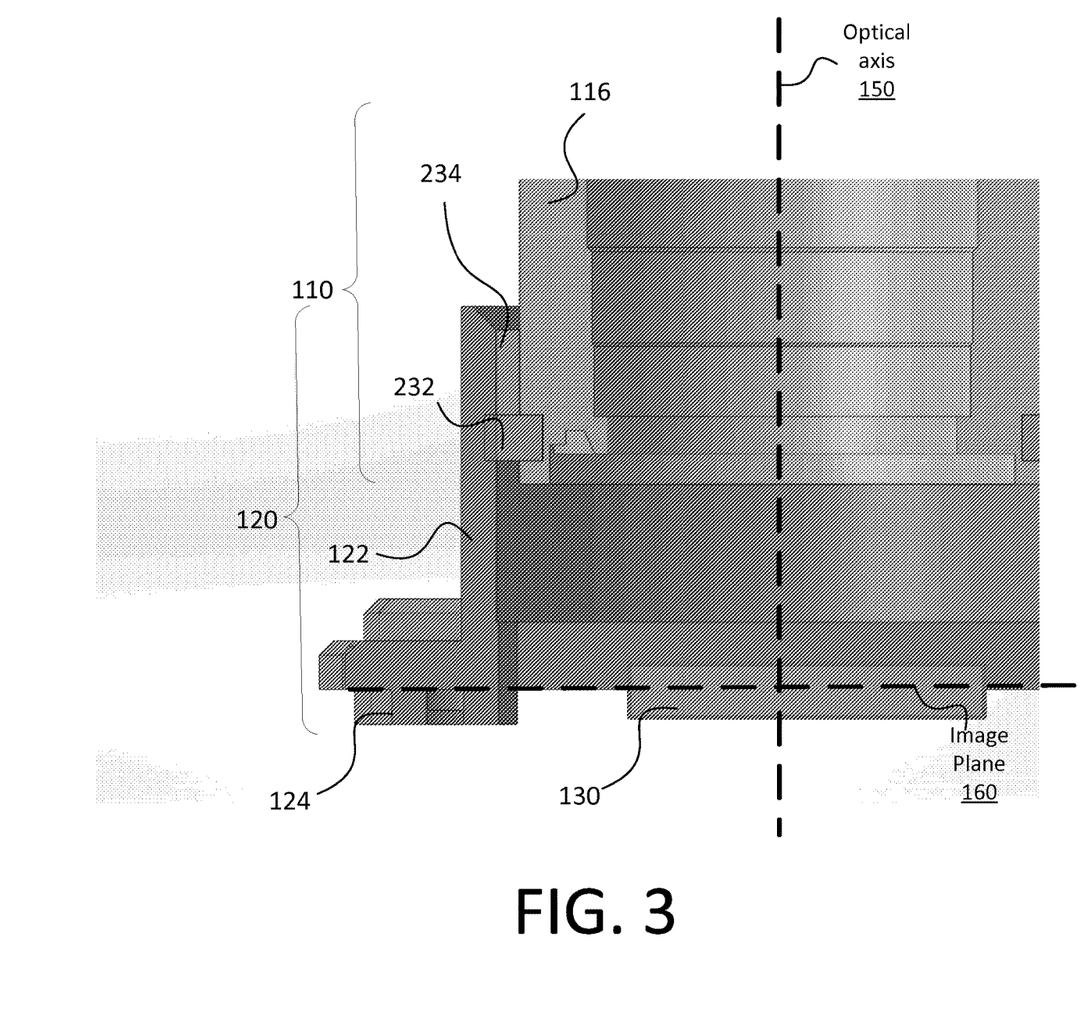
FIG. 3 illustrates a cross-sectional view of the lens holder and lens barrel sliced along a plane parallel to the optical axis, according to one embodiment.

FIG. 3 illustrates a cross-sectional view of the lens holder 120 and lens barrel 110 sliced along a plane parallel to the optical axis 150. In the illustrated example, the interior surface of the lens barrel 110 is substantially smooth and the adhesive 234 is applied to the interior surface of the lens barrel 110.

Figure 4:
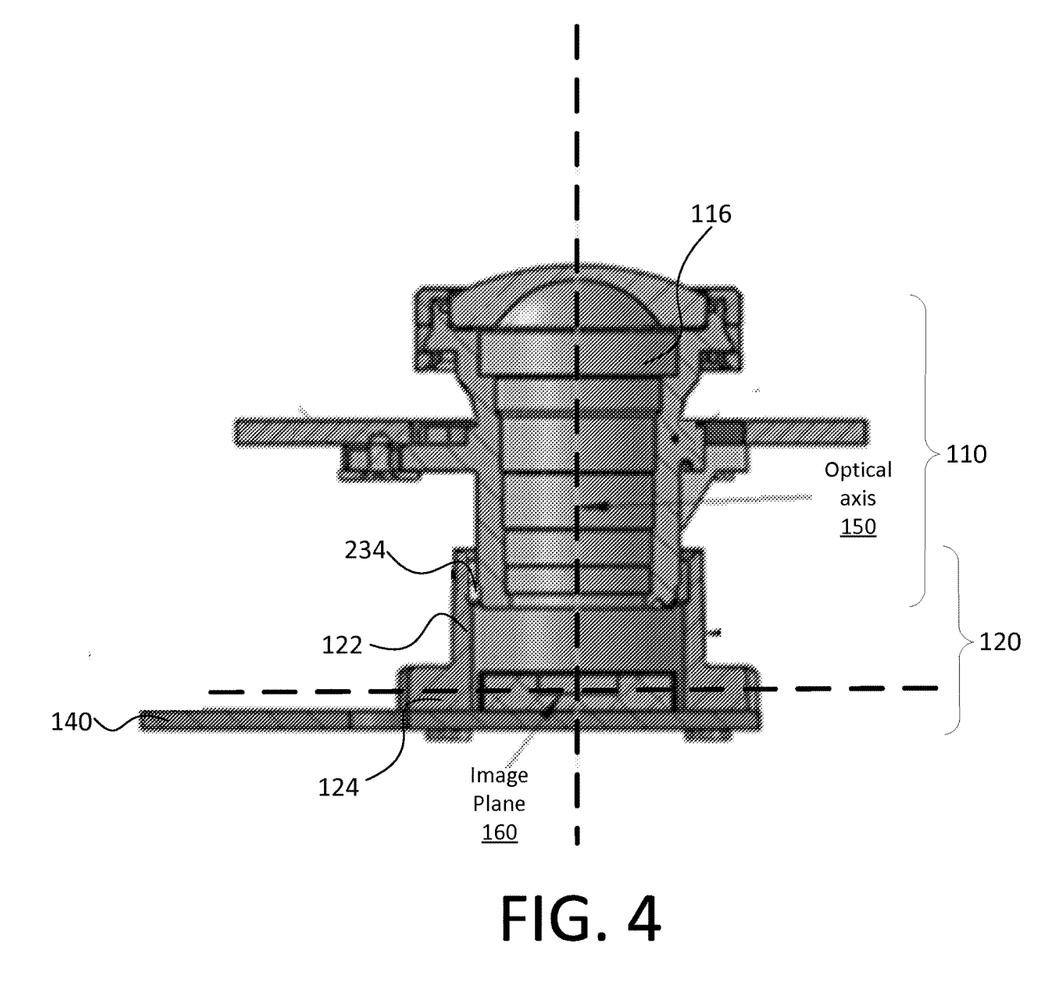
FIG. 4 illustrates a cross-sectional view of the lens holder and lens barrel sliced along a plane parallel to the optical axis, according to one embodiment.

FIG. 4 illustrates a cross-sectional view of the lens holder 120 and lens barrel 110 sliced along a plane parallel to the optical axis 150. The gasket 232 is omitted in this illustrated embodiment.

Figure 5:
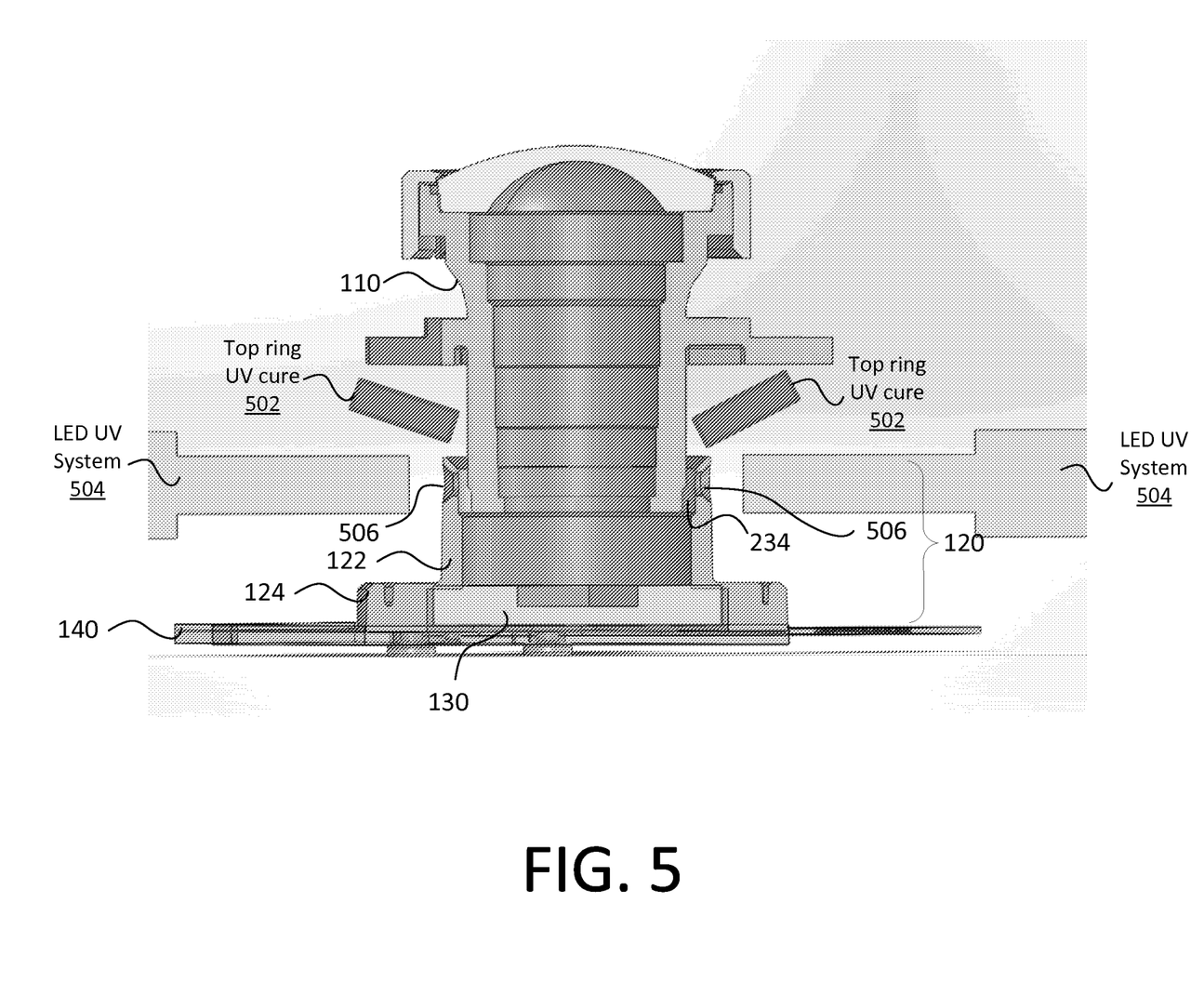
FIG. 5 illustrates an example integrated sensor and lens assembly undergoing a curing process during manufacture, according to an embodiment.

FIG. 5 illustrates an embodiment of an integrated sensor and lens assembly undergoing a curing process during manufacture. In the illustrated embodiment, the lens holder 110 includes one or more ports 506 that enable ultraviolet (UV) rays to pass through from the LED UV system 504. The UV rays cure the adhesive 234 and thereby to lock the lens barrel 110 and lens holder 120 in place after tested and properly aligned. A top ring UV cure 502 is also applied to the top of the lens holder 110. In one embodiment, the lens holder 120 includes four ports 506 equally spaced around the circumference of the tube portion 122 of the lens holder 110. Alternatively, three equally spaced ports 506 or a different number or configuration of ports 506 may be used.

Figure 6:
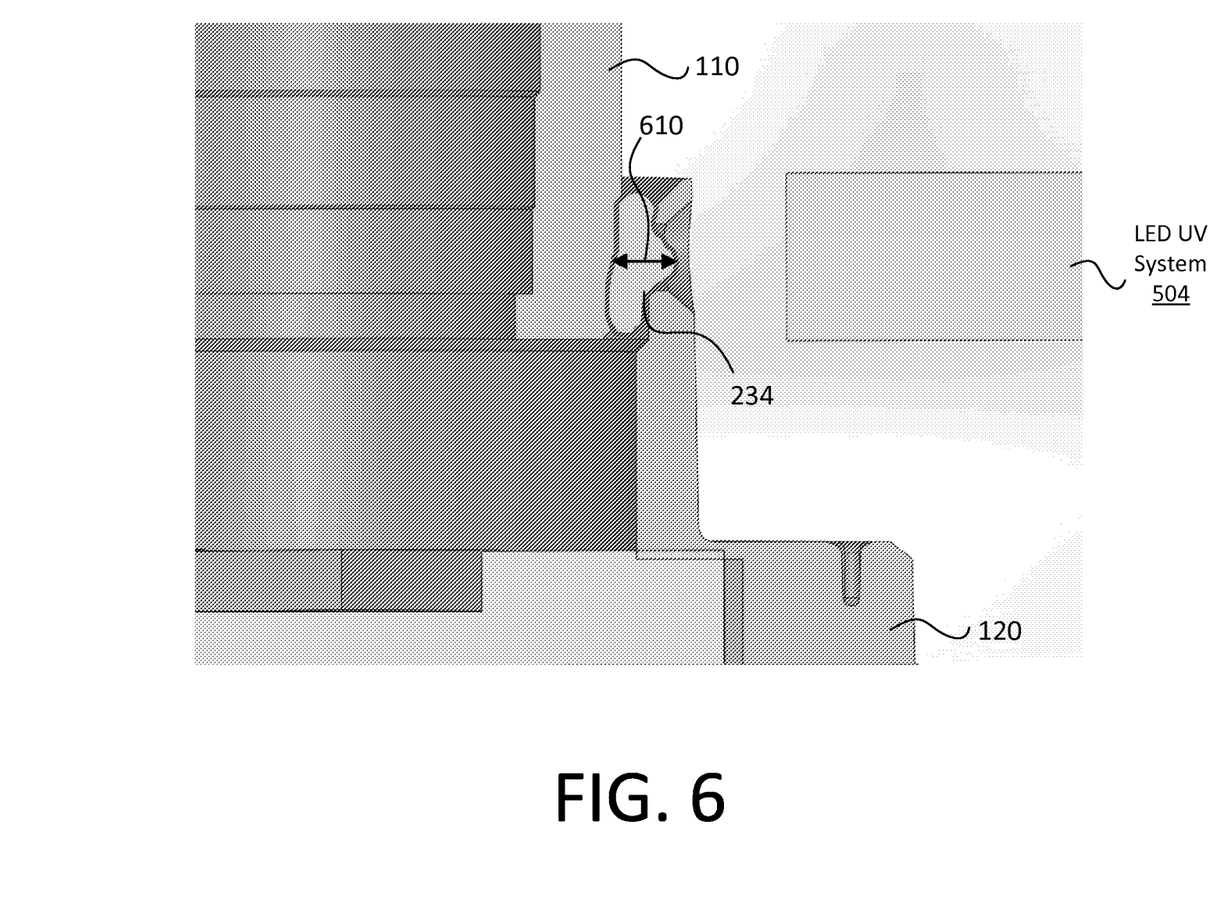
FIG. 6 is an enlarged view of the example integrated sensor and lens assembly undergoing the curing process during manufacture as illustrated in FIG. 5.

The curing process settles the lens barrel 110 in the lens holder to provide the desired modulation transfer function (MTF) and focuses position of the lenses prior to further thermal curing. As illustrated in FIG. 6, the adhesive has a curing depth such that it immobilizes the settled lens barrel 110 prior to thermal curing. Particularly, the depth of the adhesive from the external opening of the pot 506 to the interior surface of the lens barrel 110 (for example, the depth 610 in FIG. 6) locks the lens barrel 110 in place even before curing is applied.

Figure 7:
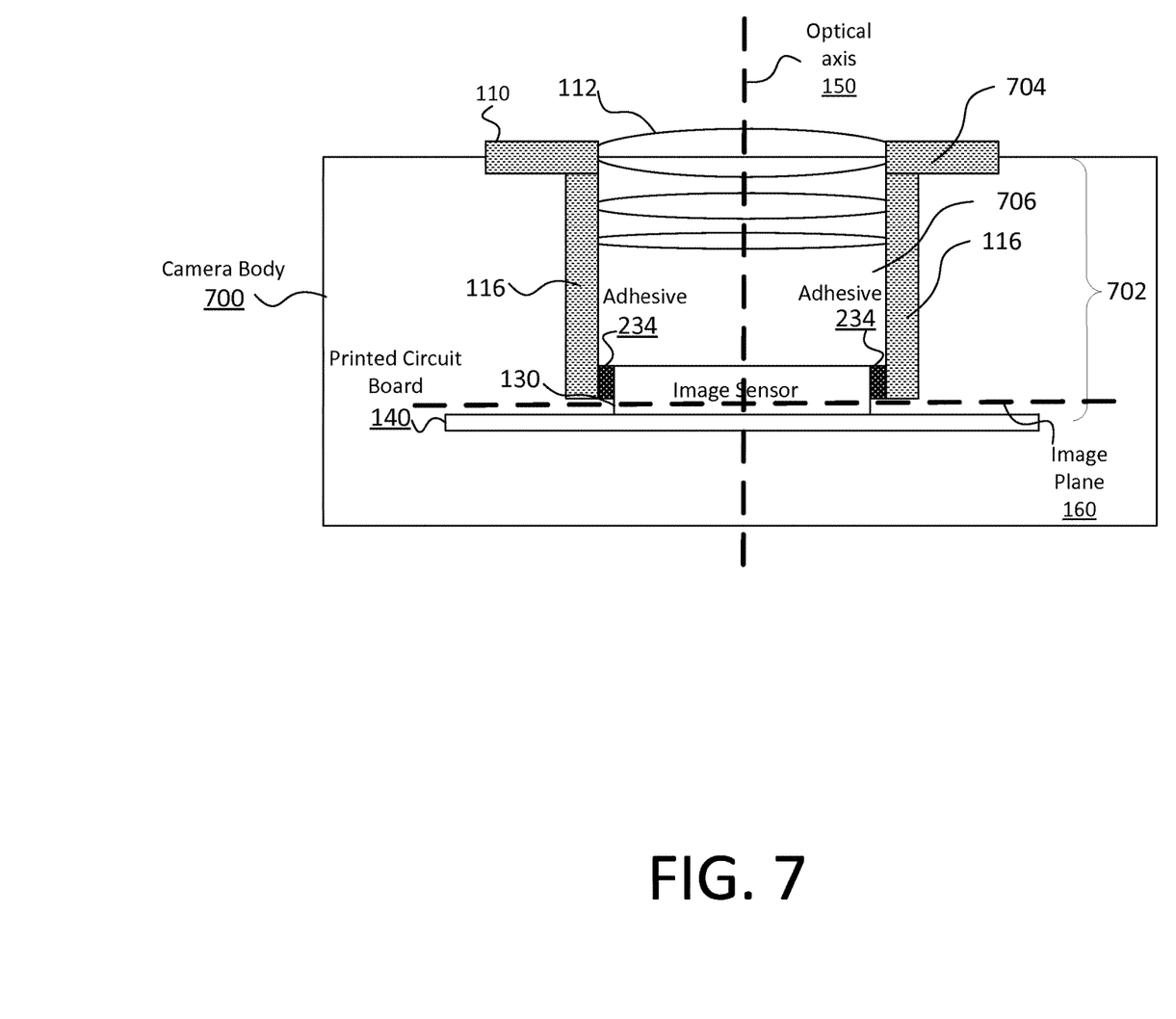
FIG. 7 illustrates an example integrated sensor and lens assembly in an example camera body, according to one embodiment.

FIG. 7 illustrates another alternative embodiment of an integrated sensor and lens assembly 702 for use in a camera body 700. The lens assembly 702 comprises a lens barrel 110, an image sensor substrate 140, and an image sensor assembly 130. Similar to the embodiment illustrated in FIG. 1, the image sensor substrate 140 comprises a printed circuit board for mounting the image sensor assembly 130 and may furthermore include various electronic components that that operate with the image sensor assembly 130 or provide external connections to other components of the camera system. The image sensor assembly 130 houses an image sensor (e.g., a high-definition image sensor) for capturing images and/or video and includes structural elements for physically coupling the image sensor assembly 130 to the image sensor substrate 140 and to lens barrel 110. The image sensor of the image sensor assembly 130 lies on an image plane 160.

The lens barrel 110 comprises one or more lenses or other optical components to direct light to the image sensor assembly 130. The lens barrel 110 comprises a lower portion 116 and an upper portion 704 having a lens window 112. The lower portion of the lens barrel 116 includes a channel 706 for receiving the image sensor assembly 130. The channel 706 can be substantially cylindrical, square, rectangular, or other shaped. The lens barrel 110 may be physically coupled to the camera body 700. The lens window 112 includes optical components to enable external light to enter the lens barrel 110 and be directed to the image sensor assembly 130. The lens barrel 110 is positioned such that the image sensor assembly 130 protrudes into the channel 706. An interior surface of the lens barrel 110 is oriented to be substantially perpendicular to the image plane 160 and substantially parallel to the optical axis 150.

The image sensor assembly 130 is adhered to the interior surface of the lens barrel 110 directly via the adhesive 234, without a separate lens holder. The image sensor assembly 130 includes a plurality of side walls oriented in a direction substantially perpendicular to the substrate 140. The adhesive 234 is applied between the interior surface of the lens barrel 110 and an outer side wall of the image sensor 130. The integrated sensor and lens assembly 702 is substantially cylindrical, square, or rectangular.

In one embodiment, the channel 706 of the lens barrel 110 is substantially square or rectangular and the image sensor assembly 130 is substantially square or rectangular. The channel 706 of the lens barrel 110 mates with the image sensor assembly 130 such that an interior surface of the channel 706 of the lens assembly 1302 adheres to the outer side wall of the image sensor 130. In another embodiment, the channel 706 of the lens barrel 110 may be substantially circular and mate with a substantially circular image sensor 130. In yet another embodiment (not shown), an adhesive 234 is applied between a top surface of the image sensor assembly 130 and a shelf that protrudes from an interior surface of the lens barrel 112 in a direction substantially parallel to the top surface of the image sensor 130. Other embodiments and features described above (e.g., the use of gasket 232, the use of ridges 236) may be combined with the embodiment of FIG. 13 in which the lens assembly 702 includes a lens barrel adhered to the image sensor assembly 130 via the adhesive 234 directly. The gasket may be positioned at a lower end of the lens barrel 110 just below the adhesive 234.

Example Camera System Configuration

Figure 8:
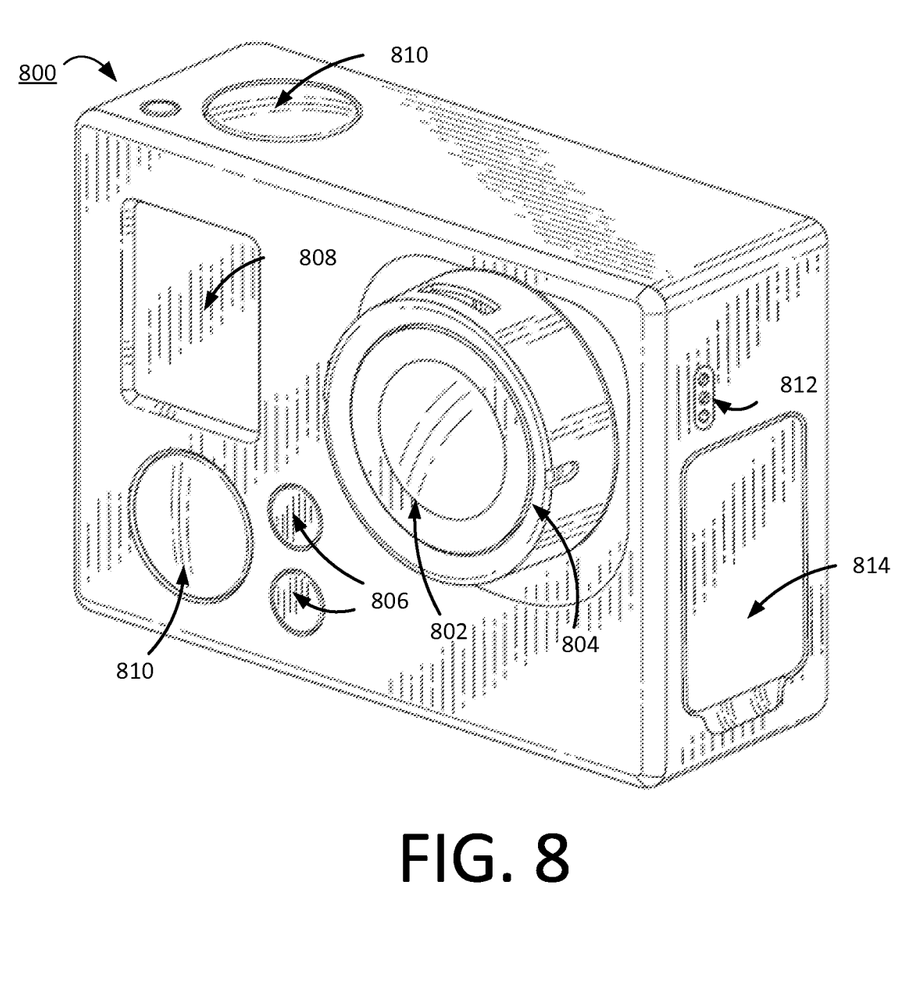
FIG. 8 illustrates an example camera that includes the example integrated image sensor and lens assembly of FIG. 1.

FIG. 8 illustrates an embodiment of an example camera 800 that includes the integrated image sensor and lens assembly 100 described above. The camera 800 comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera I 800 is configured to capture images and video, and to store captured images and video for subsequent display or playback. As illustrated, the camera 800 includes a lens 802 configured to receive light incident upon the lens and to direct received light onto an image sensor internal to the lens. The lens 802 is enclosed by a lens ring 804, which are both part of the integrated image sensor and lens assembly 100 discussed above.

The camera 800 can include various indicators, including the LED lights 806 and the LED display 808. The camera 800 can also include buttons 810 configured to allow a user of the camera to interact with the camera, to turn the camera on, and to otherwise configure the operating mode of the camera. The camera 800 can also include a microphone 812 configured to receive and record audio signals in conjunction with recording video. The side of the camera 800 includes an I/O interface 814.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An integrated image sensor and lens assembly comprising:
   an image sensor assembly defining an optical axis;
   a lens holder coupled to the image sensor assembly, the lens holder including a tubular body portion terminating in a tapered surface extending at an angle to the optical axis, the tapered surface including first and second ends and extending continuously therebetween; and
   a single-piece lens barrel coupled to the lens holder by an adhesive applied between the lens holder and the single-piece lens barrel such that the adhesive extends in non-perpendicular relation to the optical axis.

2. The integrated image sensor and lens assembly of claim 1, wherein the single-piece lens barrel includes one or more lenses to direct light to the image sensor assembly.

3. The integrated image sensor and lens assembly of claim 1, wherein the single-piece lens barrel defines an upper end and a lower end, the single-piece lens barrel tapering inwardly from the upper end towards the lower end.

4. The integrated image sensor and lens assembly of claim 1, wherein the lens holder encloses the image sensor assembly.

5. The integrated image sensor and lens assembly of claim 4, wherein the lens holder defines a recess configured to receive the image sensor assembly.

6. The integrated image sensor and lens assembly of claim 5, wherein the lens holder further includes a base portion secured to the tubular body portion, and the tubular body portion defines a cylindrical channel configured to receive the single-piece lens barrel.

7. The integrated image sensor and lens assembly of claim 6, wherein the recess is defined by the base portion.

8. The integrated image sensor and lens assembly of claim 6, wherein the tubular body portion defines a first transverse cross-sectional configuration, and the base portion defines a second transverse cross-sectional configuration different than the first transverse cross-sectional configuration.

9. The integrated image sensor and lens assembly of claim 8, wherein the first transverse cross-sectional configuration is annular, and the second transverse cross-sectional configuration is non-annular.

10. The integrated image sensor and lens assembly of claim 1, wherein the single-piece lens barrel includes ridges extending partially along an overall length thereof.

11. The integrated image sensor and lens assembly of claim 10, wherein the ridges are provided on an exterior surface of the single-piece lens barrel.

12. The integrated image sensor and lens assembly of claim 1, wherein the single-piece lens barrel defines an upper end and a lower end, the single-piece lens barrel including ridges extending non-continuously therebetween.

13. The integrated image sensor and lens assembly of claim 12, wherein the single-piece lens barrel further includes a radial extension located between the ridges and the upper end of the single-piece lens barrel.

14. The integrated image sensor and lens assembly of claim 13, wherein the radial extension is positioned externally of the lens holder.

15. An integrated image sensor and lens assembly comprising:
an image sensor assembly defining an optical axis;
a lens holder coupled to the image sensor assembly, the lens holder including:
an uppermost surface;
a tapered, non-threaded surface extending from the uppermost surface at an angle to the optical axis, the tapered, non-threaded surface including first and second ends and extending continuously therebetween; and
an inner surface extending from the tapered, non-threaded surface such that the tapered, non-threaded surface extends between the uppermost surface and the inner surface; and
a lens barrel adhesively secured within the lens holder.

16. The integrated image sensor and lens assembly of claim 15, wherein the lens barrel includes:
an uppermost end;
a lowermost end opposite to the uppermost end; and
external ridges extending non-continuously between the uppermost end and the lowermost end.

17. The integrated image sensor and lens assembly of claim 16, wherein the lens barrel further includes a radial extension located between the external ridges and the uppermost end, the radial extension spaced from the lens holder along the optical axis.

18. An integrated image sensor and lens assembly comprising:
an image sensor assembly defining an optical axis;
a lens holder coupled to the image sensor assembly, the lens holder including an inner surface and a non-threaded surface, the non-threaded surface extending:
radially outward from the inner surface; and
axially along the optical axis, the non-threaded surface including first and second ends and extending continuously therebetween; and
a lens barrel extending into the lens holder, the lens barrel and the lens holder secured together by an adhesive applied in non-perpendicular relation to the optical axis.

19. The integrated image sensor and lens assembly of claim 18, wherein the lens barrel includes a lowermost end positioned within the lens holder and an uppermost end opposite to the lowermost end, the uppermost end extending radially beyond of the lens holder.

20. The integrated image sensor and lens assembly of claim 19, wherein the lens barrel further includes a radial extension located between the uppermost end and the lowermost end, the radial extension spaced from the lens holder along the optical axis.

* * * * *